L. ZEIGER.
BROOM BRACE.
APPLICATION FILED OCT. 5, 1916.
1,216,909.
Patented Feb. 20, 1917.
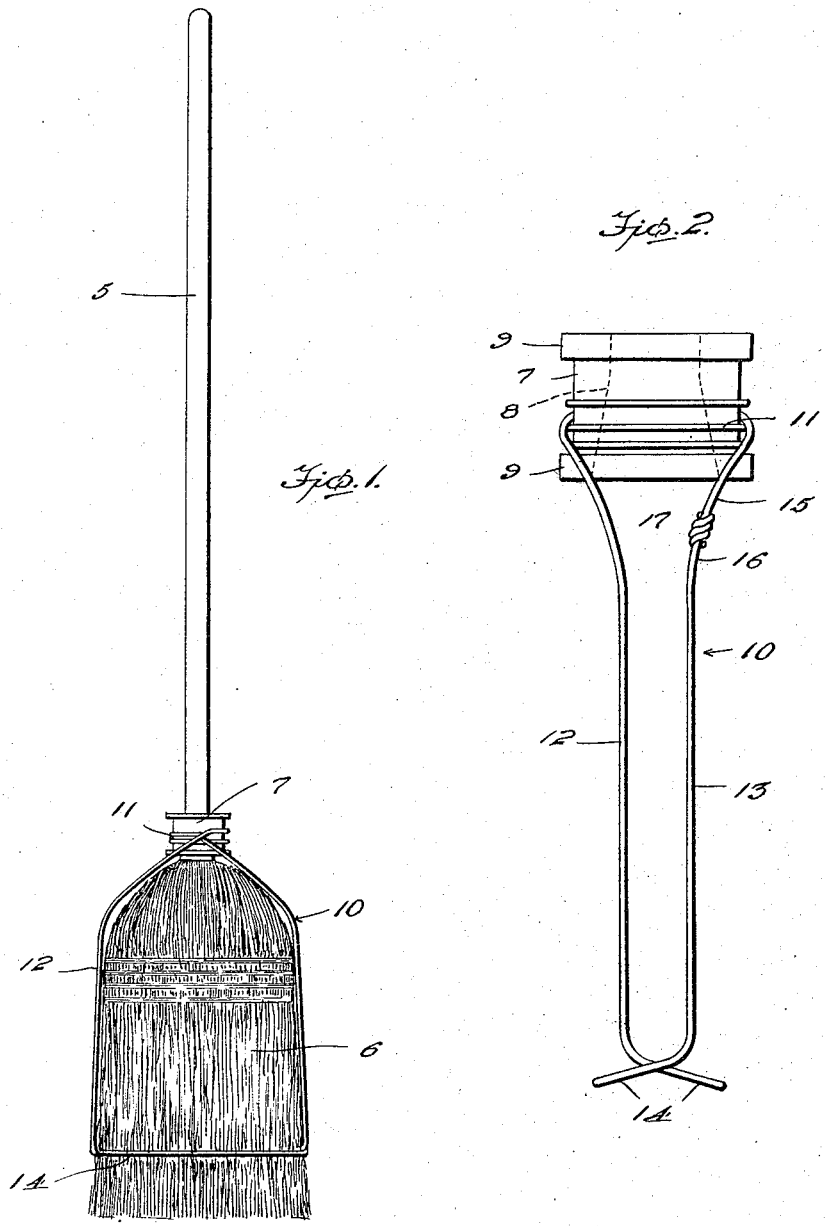
Inventor
L. Zeiger.
By John Louis Waters
Attorney
Witnesses

UNITED STATES PATENT OFFICE.

LEE ZEIGER, OF MELBOURNE, IOWA.

BROOM-BRACE.

1,216,909.  Specification of Letters Patent.  Patented Feb. 20, 1917.

Application filed October 5, 1916. Serial No. 123,857.

*To all whom it may concern:*

Be it known that I, LEE ZEIGER, a citizen of the United States, residing at Melbourne, in the county of Marshall and State of Iowa, have invented certain useful Improvements in Broom-Braces, of which the following is a specification, reference being had therein to the accompanying drawing.

This invention relates to improvements in broom bridles or braces, one object of the invention being the provision of a device which is readily placed in position upon any broom and which will hold the straw resiliently compressed and prevent the fraying or breaking thereof, thus adding to the durability and practicability of the broom.

A further object of this invention is the provision of a device of this character which is simple, durable and inexpensive and thoroughly efficient and practical in use.

In the accompanying drawings:

Figure 1 is a view in elevation of a broom provided with the present bridle or brace.

Fig. 2 is a side elevation of the bridle or brace *per se*.

Referring to the drawings, the numeral 5 designates the handle and 6 the head of the broom.

Detachably fitting upon the handle 5 so that the same may be placed thereon or removed therefrom is a sleeve 7 provided with a frusto-conical bore 8 and with the two collars 9. The resilient member 10 is made from a single strand of wire and includes the gripping or holding coil 11 which is formed by twisting a portion of the wire thereabout the collar 7 at the same time that the two bails 12 and 13 are formed. Each bail is provided with the bent ends 14 which are crossed as illustrated in Fig. 2 so that the bail 13 will have its straw engaging end 14 upon the opposite side of the broom to its junction point of the spool or sleeve 7 while the bail 12 will be disposed in a similar position at the opposite side of such member.

In forming the member 10 one terminal 15 of the strand of wire is held while nearly two coils of the coil 11 are formed upon the member 7, the bail 12 being then formed and the remaining two coils of the coil 11 are then formed finally terminating with the bail 13 so that the terminal 16 may be connected as at 17 to the terminal 15. This connection here shown is a twisted connection, but it is apparent that the terminals may be welded or otherwise secured together.

In using the present device, the terminals 14 of the members 12 and 13 which have a normal tendency, due to the coil 11, to move toward each other, are separated and let down over the handle 5 and head 6 of the broom, the frusto-conical bore 8 of the spool 7 being placed upon the handle 5.

The frictional action of the two members 12 and 13 in gripping the head of the broom will strengthen the straws while the spool 7 will assume the position as shown in Fig. 1 or any desired position upon the handle due to the position of the ends 14 of the members 12 and 13.

What I claim, as new, is:

1. A broom bridle or brace including a handle receiving spool and two resilient clamping members made from a single strand of wire and having the intermediate portions thereof coiled about the spool to act as a holding means and also imparting resiliency to the members.

2. A broom bridle or brace including a spool, and a broom head engaging member made from a single strand of wire and including a plurality of coils surrounding the spool and two broom head embracing bails the lower ends of which are adapted to be crossed and terminating upon opposite sides of the head of the portion adjacent to the spool, the coils imparting resiliency to the bails and cause them to grip the broom head.

In testimony whereof I affix my signature.

LEE ZEIGER.

Copies of this patent may be obtained for five cents each, by addressing the "Commissioner of Patents, Washington, D. C."